Patented Oct. 14, 1930

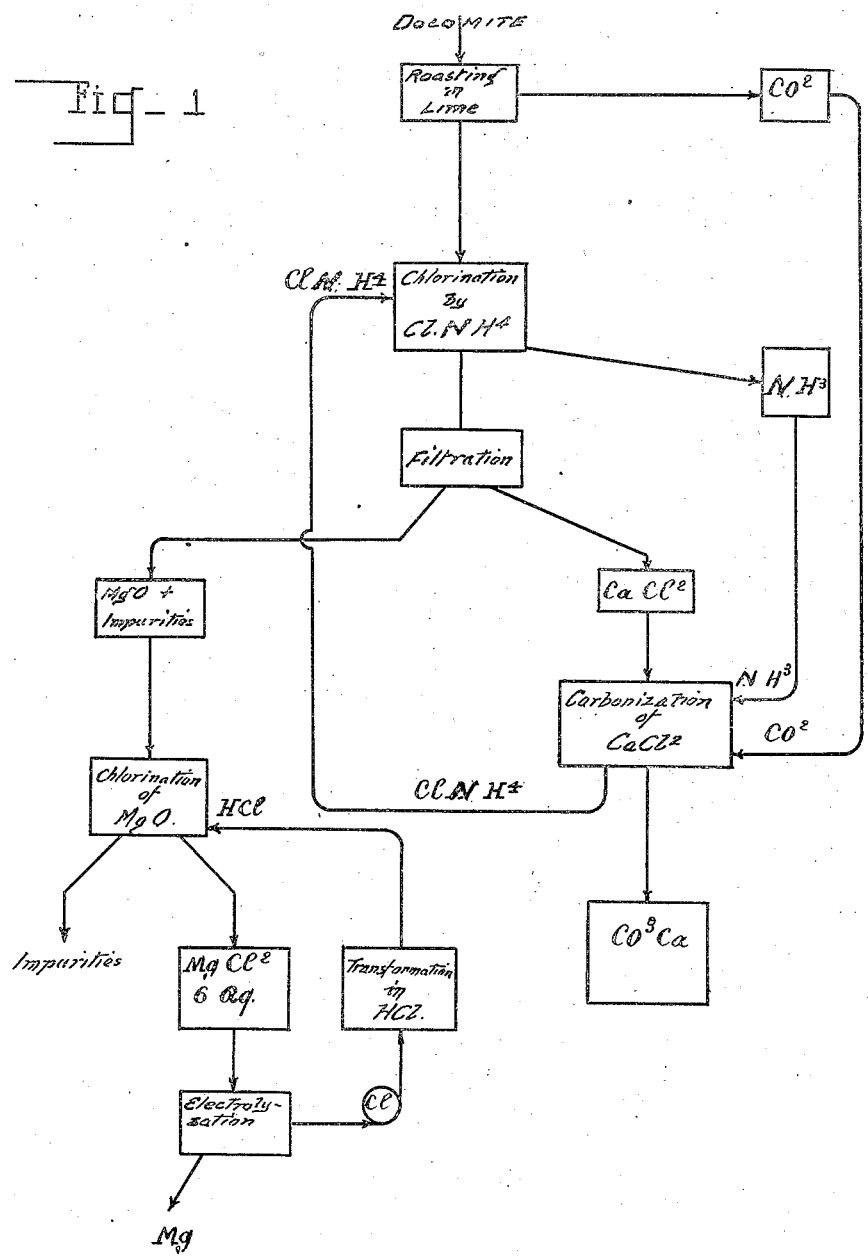

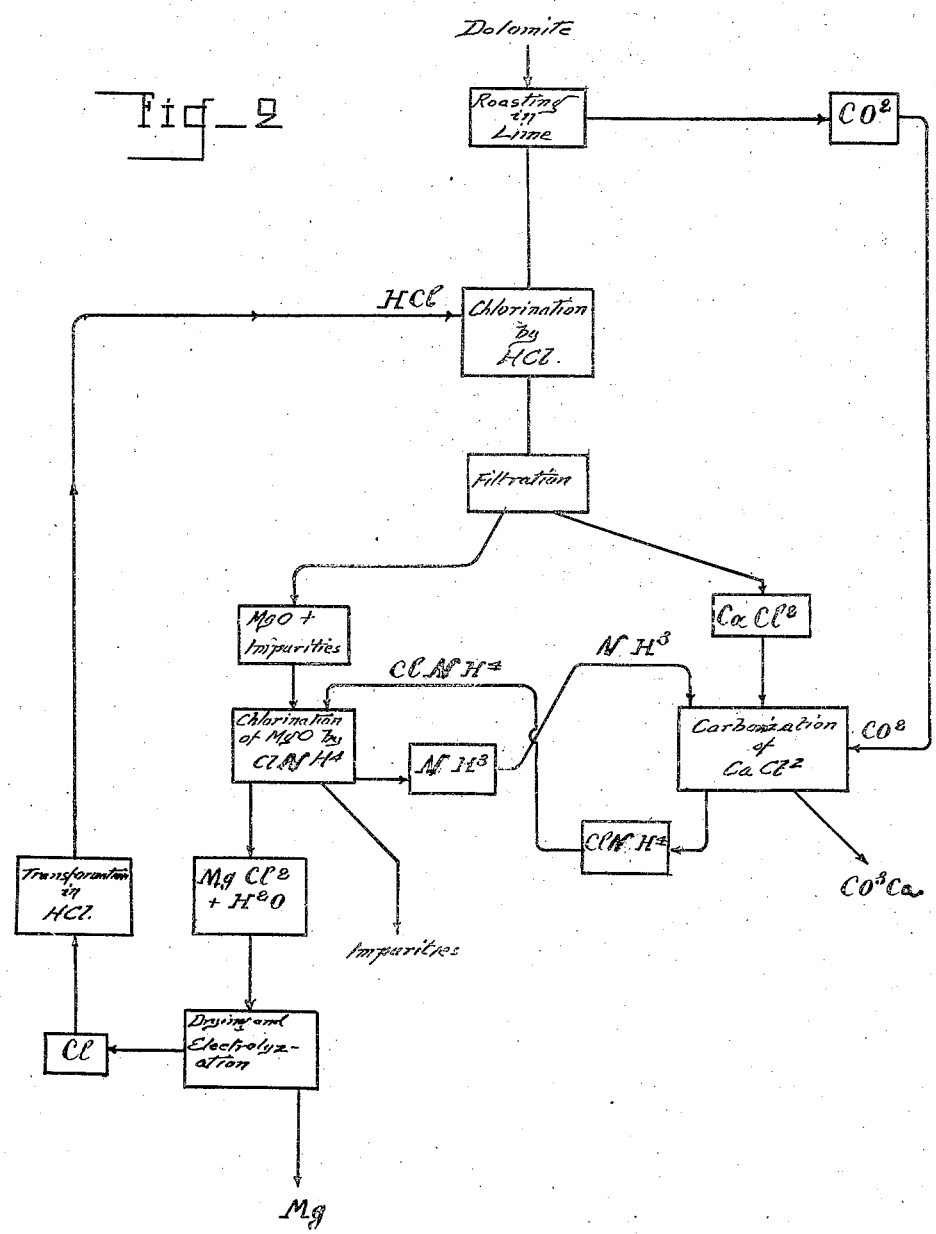

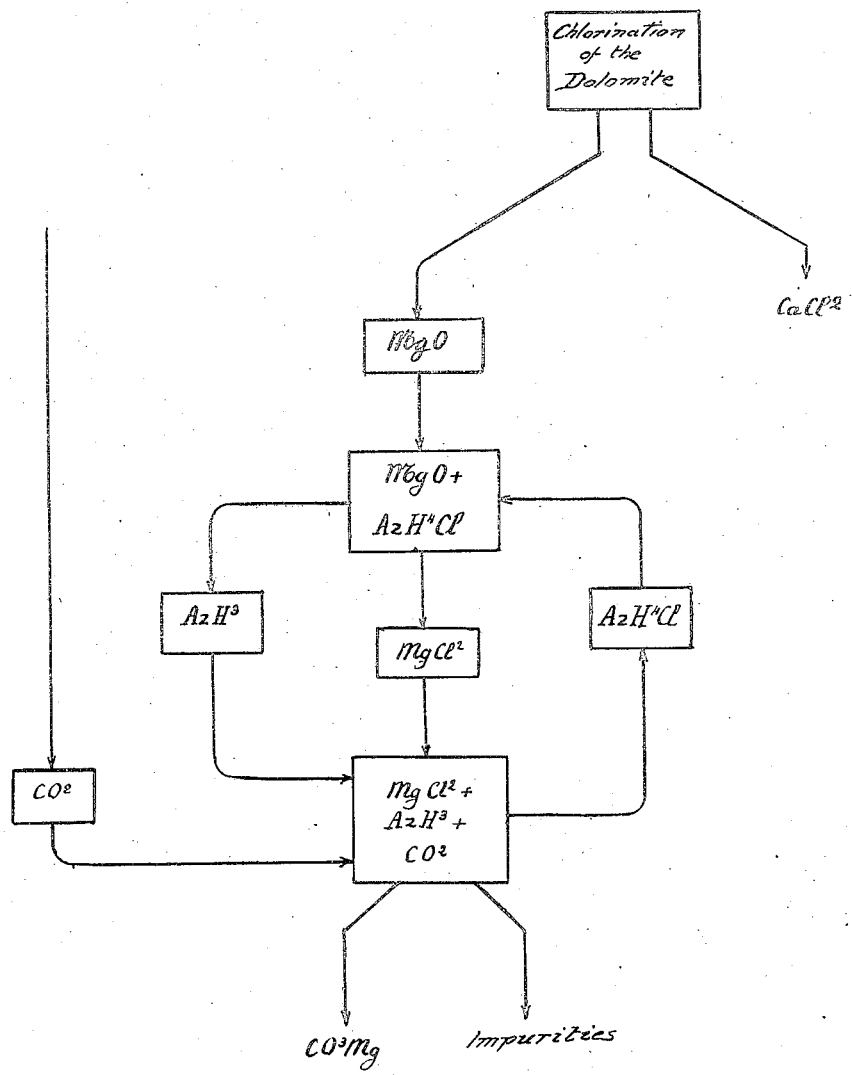

1,778,659

UNITED STATES PATENT OFFICE

JOSEPH BLUMENFELD, OF NEUILLY-SUR-SEINE, FRANCE, ASSIGNOR TO SOCIETE DE PRODUITS CHIMIQUES DES TERRES RARES, OF PARIS, SEINE, FRANCE

PROCESS FOR THE TREATMENT OF DOLOMITE AND OTHER CARBONATES OF MAGNESIUM

Application filed March 13, 1930, Serial No. 435,574, and in France March 11, 1929.

It is of great commercial importance to be able to recover the magnesium and the calcium contained in dolomite or other natural forms of carbonate of magnesium.

When employing dolomite, etc., for obtaining magnesium oxide or salts in a sufficiently pure state (which can be used for the electrolytic manufacture of magnesium) it is necessary to remove the impurities, particularly calcium compounds, contained in such carbonates.

Hitherto the magnesium and calcium were separated by treating dolomite, after a burning or roasting at about 900° C. with water and carbon dioxide in excess, thus obtaining a mixture of magnesium bicarbonate and calcium bicarbonate, these two salts being separated in the cold state and under pressure, by fractional solution. Other processes are also employed. Such processes are inefficient and expensive.

The present invention relates to the removal of the impurities, and especially the calcium compounds, contained in the dolomite (or other natural carbonates) and it allows of collecting all of the Mg in the form of magnesium chloride containing not over 3 per cent of calcium, the $MgCl_2$ being in excellent condition and the process being inexpensive and efficient.

The said process consists in first roasting or burning as usual, then subjecting the calcines to a fractional chloridizing, the calcium being removed as calcium chloride in the first period, the magnesium being removed as magnesium chloride in the second period, while the other impurities (silica, silicates, etc.) remain in the insoluble residue.

Experience has shown that when dolomite is treated with an appropriate chloride, the whole of the lime is converted into calcium chloride before the chlorine compounds begins to act upon the magnesia and upon such impurities as the iron, silicon, etc., the reagent being then added in suitable quantity and under proper conditions, and the calcium, converted into chloride, is removed simply by filtering or centrifugal draining and then washing.

By again treating the insoluble residue from this first operation with an appropriate substance containing chlorine, it is found that the whole of the magnesia is acted upon before such impurities such as oxides of iron, silica, etc., are affected. The reagent being employed in the proper quantity, it is possible to dissolve all the magnesium, leaving such impurities (which remain in the insoluble state) the only impurity in the magnesium chloride being the amount of calcium which was allowed to remain undissolved in the first chloride treatment.

The said treatment preferably forms part of a cycle of manufacture of magnesium by electrolysis of the chloride, in which the resulting chlorine is converted into hydrochloric acid and used for treating the dolomite, etc.

It is advantageous to treat the calcium chloride resulting from treatment of the dolomite, by ammonia and carbonic anhydride, which two substances are in the proportion corresponding to a neutral ammonium carbonate in slight excess, in such manner as to precipitate calcium carbonate $CaCO_3$, and form ammonium chloride solution. Thereby the ammonia itself can be reused in a closed cycle.

The series of operations preferably takes place in a closed cycle; the chloride treatment of the roasted dolomite is effected by ammonium chloride, the ammonia disengaged during this chlorine treatment being employed for treating the calcium chloride, and the ammonium chloride resulting from this latter treatment being again used for a chlorine treatment of a fresh quantity of roasted dolomite.

The following description relates, by way of example, to two particular methods by which the said treatment may be carried into effect.

The diagrammatic Figures 1 and 2 show the series of operation in the respective cases.

In the first of these processes, dolomite is first roasted or burned in the known manner, and the carbon dioxide gas from the furnaces is collected for use in a subsequent operation. Roasting the carbonate of magnesium and of calcium leaves magnesia, lime and the various known impurities (iron, silica, aluminum and gangue or waste).

When cooled, the said mass is subjected (Figure 1) to a chloride treatment, preferably with ammonium chloride solution. The lime is entirely converted into calcium chloride before the ammonium, chloride commences to act upon the other constituents of the material. The ammonium chloride is used in the proper proportion relatively to the lime (which has been determined by analysis) contained in the material, and thus the conversion of the lime can be effected without any appreciable effect on the magnesia.

The reaction preferably takes place at the proper temperature and time so that the ammonia will be disengaged to the amount desired. In practice, the operation is best effected at the boiling point. The reaction, known per se, is as follows:

$$CaO + 2NH_4Cl = CaCl_2 + 2NH_3 + H_2O$$

After the ammonia has been given off (it being collected to be used in a subsequent operation) there remains a solution of calcium chloride containing insoluble substances such as magnesia, various metallic oxides (of iron, silicon, aluminum etc.,) and waste.

Such insoluble substances are separated by filtering and are then washed, and the wash water still contains calcium chloride which may be concentrated before it is added to the main calcium chloride liquor.

Next follows a second chlorine treatment adapted to dissolve the magnesium as chloride (leaving the compounds of iron, silicon, aluminum etc. and waste, undissolved). For this purpose, the insoluble material is treated with a chloride such as $NH_4Cl$ or with hydrochloric acid, to convert the magnesium into magnesium chloride. The whole of the magnesia is thus converted before the impurities are acted upon, and the resulting magnesium chloride is removed by decantation or filtering and washing. The magnesium chloride solution is concentrated to crystallization.

The crystallized magnesium chloride ($MgCl_2.6H_2O$) is then dehydrated and subjected to electrolysis; the chlorine which is recovered in the electrolytic vats may be converted into hydrochloric acid, and this can be used for chloridization of another quantity of magnesia. The last mother liquors from the successive crystallizations of $MgCl_2.6H_2O$ which are rich in $CaCl_2$ are returned to the first part of the cycle.

The dissolved calcium chloride resulting from the treatment of the roasted dolomite by the ammonium chloride is then treated with the ammonia obtained by the previous chlorine treatment (Figure 1) and with the carbon dioxide obtained from the furnaces used for the roasting of the dolomite.

The operation is as follows:

The ammonia gas is supplied to the $CaCl_2$ solution and is dissolved therein until the liquid contains two molecules of ammonia for one molecule of calcium chloride.

Then $CO_2$ is added, and it precipitates the calcium according to the reaction.

$$CaCl_2 + CO_2 + H_2O + 2NH_3 = CO_3Ca + 2NH_4Cl$$

This operation must take place while the liquor is substantially cold, and preferably at 30°–35° C. since the contrary reaction would occur in the hot state. It is observed that when operating at this temperature and in the presence of the proper excess of $(NH_4)_2CO_3$, (or $NH_3$ and $CO_2$) the aforesaid reaction will be quantitative, in the direction indicated. It is necessary to avoid excess of $CO_2$, in order to allow the formation of a neutral calcium carbonate, with the exclusion of acid carbonate. The calcium carbonate $CaCO_3$ is insoluble, and especially when the solution is alkaline due to excess of $NH_3$, and $CaCO_3$ thus precipitates; it is then filtered off and washed.

The resulting ammonium chloride, and also the wash water, are again used in a subsequent operation for the chlorine treatment of another portion of dolomite.

The carbonate of lime is collected as a by-product.

It is to be noted that the aforesaid operations form a closed cycle. The ammonium chloride circulates constantly, without any considerable loss, from the first chloridization treatment to the carbonate treating operation, and inversely. The small losses are compensated for, as desired.

In the second modification (Figure 2) the roasted dolomite is treated in the first chloridization step with hydrochloric acid. In the second step the residue containing magnesia, is treated with ammonium chloride at the boiling point, and the ammonia disengaged is used in the carbonation of the calcium chloride. The hydrochloric acid required for the chlorine treatment of the roasted dolomite is produced from the chlorine liberated in the electrolysis of the magnesium chloride. In this case, the operation also takes place in a closed cycle.

I claim:—

In the treatment of dolomite, (a) first calcining the dolomite, (b) subjecting the roasted dolomite to only a sufficient chloridization treatment to convert the major part of the lime into calcium chloride, (c) separating the latter from the residue containing the major part at least of the magnesia in an insoluble state, (d) subjecting such residue to a further chlorization treatment to convert the major part at least of the magnesia into $MgCl_2$, (e) separating the solution from the insoluble impurities, (f) converting the $MgCl_2$ into a solid state, and (g) subjecting same to electrolysis, (h) converting the chlorine from step $g$ into hydrochloric acid, (i) precipitating calcium carbonate from the calcium chloride solution by treating same with ammonia and gases containing carbon dioxide to also form ammonium chloride solution, one of the chloridizations being performed by treatment with the hydrochloric acid from step $h$, and one of the chloridizations being performed by treatment with the ammonium chloride solution from said step $i$.

In testimony whereof I have signed this specification at Paris, France.

JOSEPH BLUMENFELD.